United States Patent
Seo et al.

(10) Patent No.: US 7,406,132 B2
(45) Date of Patent: Jul. 29, 2008

(54) PRE-EQUALIZER, VSB TRANSMISSION SYSTEM USING THE SAME, AND TRANSMISSION METHOD THEREOF

(75) Inventors: Jae-Hyun Seo, Daegu (KR); Yong-Tae Lee, Daejeon (KR); Seung-Won Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 937 days.

(21) Appl. No.: 10/267,818

(22) Filed: Oct. 10, 2002

(65) Prior Publication Data
US 2004/0008764 A1    Jan. 15, 2004

(30) Foreign Application Priority Data
Jul. 9, 2002    (KR) ............................... 2002-39738

(51) Int. Cl.
*H04B 15/00* (2006.01)
*H04L 25/03* (2006.01)
*H04L 25/49* (2006.01)
(52) U.S. Cl. ...................................... 375/296; 375/285
(58) Field of Classification Search ................. 375/229, 375/231, 232, 285, 296, 297; 333/18, 138; 381/103; 708/323
See application file for complete search history.

(56) References Cited

U.S. PATENT DOCUMENTS

| | | | | |
|---|---|---|---|---|
| 3,795,865 A | * | 3/1974 | Armstrong | 375/232 |
| 4,334,313 A | * | 6/1982 | Gitlin et al. | 375/355 |
| 4,621,366 A | * | 11/1986 | Cain et al. | 375/222 |
| 5,297,165 A | * | 3/1994 | Ueda et al. | 375/230 |
| 5,450,339 A | * | 9/1995 | Chester et al. | 708/322 |
| 5,805,480 A | * | 9/1998 | Greenberg | 708/322 |
| 5,852,630 A | * | 12/1998 | Langberg et al. | 375/219 |
| 5,867,065 A | * | 2/1999 | Leyendecker | 330/149 |
| 5,898,731 A | * | 4/1999 | Kwak | 375/230 |
| 6,038,251 A | * | 3/2000 | Chen | 375/222 |
| 6,272,108 B1 | * | 8/2001 | Chapman | 370/226 |
| 6,285,412 B1 | | 9/2001 | Twitchell | |
| 6,400,760 B1 | * | 6/2002 | Gu et al. | 375/232 |
| 6,473,133 B1 | * | 10/2002 | Twitchell et al. | 348/608 |
| 6,505,222 B1 | * | 1/2003 | Davis et al. | 708/323 |
| 6,687,292 B1 | * | 2/2004 | Garcia | 375/235 |
| 6,810,084 B1 | * | 10/2004 | Jun et al. | 375/240.28 |

(Continued)

FOREIGN PATENT DOCUMENTS

KR    97-56720    7/1997

(Continued)

*Primary Examiner*—David B Lugo
(74) *Attorney, Agent, or Firm*—Lowe Hauptman Ham & Berner LLP

(57) ABSTRACT

Disclosed is a pre-equalizer, a vestigial sideband (VSB) transmission system using the pre-equalizer, and a VSB transmission method. A first transmit signal is stored in a first memory, and a pre-equalizer pre-equalizes the first transmit signal based on a set tap coefficient. A transmitter modulates the pre-equalized first transmit signal, and sends the modulated signal. The first transmit signal is fed back to a receiver, which demodulates the transmitted first transmit signal and stores the demodulated signal as the second transmit signal in a second memory. Subsequently, the pre-equalizer calculates a tap coefficient based on an error value as the difference between the first transmit signal and the second transmit signal, and updates the set tap coefficient based on the calculated tap coefficient.

14 Claims, 6 Drawing Sheets

U.S. PATENT DOCUMENTS

| | | | |
|---|---|---|---|
| 6,836,517 B2 * | 12/2004 | Nagatani et al. | 375/296 |
| 6,853,695 B1 * | 2/2005 | Betts et al. | 375/371 |
| 2001/0033517 A1 * | 10/2001 | Ando et al. | 365/200 |
| 2001/0033615 A1 * | 10/2001 | Kokuryo et al. | 375/231 |
| 2003/0099289 A1 * | 5/2003 | Birru | 375/233 |
| 2003/0099389 A1 * | 5/2003 | Birru | 375/233 |

FOREIGN PATENT DOCUMENTS

KR       2000-31138       6/2000

* cited by examiner (a) MEAN SQUARE ERROR OF CONVENTIONAL EQUALIZER (b) MEAN SQUARE ERROR OF PRESENT INVENTION

PRE-EQUALIZER, VSB TRANSMISSION SYSTEM USING THE SAME, AND TRANSMISSION METHOD THEREOF

BACKGROUND OF THE INVENTION (a) Field of the Invention

The present invention relates to a transmission system for digital signals. More specifically, the present invention relates to a pre-equalizer, a vestigial sideband (VSB) transmission system using the pre-equalizer, and a transmission method thereof.

(b) Description of the Related Art

In Korea, the ground wave digital broadcasting system adopted the American VSB system as the standard of the transmission system in 1997, and after experimental broadcasting in 1999, proceeded in earnest with it in the National Capital area in the second half of 2001. One of the most important pieces of equipment for the digital broadcasting transmission is the digital TV (DTV) transmitter and repeater. In the case of conventional analog broadcasting, sub-channels are provided adjacent to the broadcasting channels so as to reduce interference between adjacent channels, and they are not actually used. With the switchover of analog broadcasting to digital broadcasting, however, the channels adjacent to the broadcasting channels can be used to efficiently utilize limited frequency resources.

For this purpose, a channel filter must be provided at the final stage of the DTV transmitter. The reason for this is that the channel filter is used as a band-pass filter for eliminating an unnecessary frequency component from the out-of-band to reduce interference between adjacent channels.

For a channel filter of which the band has a constant magnitude, the filtering characteristics are excellent, but the group delay characteristic is extremely large at both ends of the band, which lowers the signal-to-noise ratio (SNR) of the transmitted signal.

Thus the use of a pre-equalizer for compensating for the channel filter is essential in order to enhance the performance of the transmitter. Without the pre-equalizer used as a compensating means, the SNR of the transmit signal as the final output of the transmitter is lowered and the performance of the transmitter is deteriorated due to the spectrum energy of an undesired band.

The equalizer used for the receiver of the VSB transmission system is usually of a decision-feedback type. This is to solve problems caused by multiple paths between a transmitter and receiver and a distortion of channels. But the use of a linear equalizer rather than the decision-feedback type equalizer is adequate for the VSB transmitter, in which the multiple paths induced by the channel filter are not so long.

Having knowledge of the signal to be transmitted, the conventional pre-equalizer uses the least mean square (LMS) algorithm to calculate a tap coefficient for compensating for a group delay characteristic. However, the structural complexity of the equalizer increases because a means for extracting the transmit signal in real time is necessary in order to use the LMS algorithm.

Moreover, the tap coefficient is updated in real time for the transmit signal with a consequence of an increase in the probability of errors occurring during the signal transmission, so that the tap coefficient cannot be calculated accurately and the SNR of the transmit signal decreases.

SUMMARY OF THE INVENTION

It is an object of the present invention to solve the problems with the prior art, and to provide a pre-equalizer of a simplified structure that accurately calculates a tap coefficient for pre-equalization in VSB signal transmission.

It is another object of the present invention to provide a VSB transmission system and its transmission method for more stable signal transmission using the pre-equalizer.

In one aspect of the present invention, a pre-equalizer is provided that includes: a first memory for storing a first transmit signal to be transmitted, the first transmit signal being externally applied; a second memory for storing a second transmit signal, the first signal being modulated, transmitted, fed back and demodulated into the second transmit signal; and an equalizer for calculating a tap coefficient based on an error value determined as the difference between the first transmit signal stored in the first memory and the second transmit signal stored in the second memory, and performing pre-equalization based on the tap coefficient.

The equalizer includes: an N-tap digital filter for equalizing the input transmit signal based on a set tap coefficient; a tap coefficient memory section for storing the tap coefficient of the digital filter; a first adder for calculating an error value as the difference between the first transmit signal stored in the first memory and the second transmit signal stored in the second memory; and a second adder for calculating a new tap coefficient based on the error value and storing the calculated tap coefficient in the tap coefficient memory section.

The equalizer further includes: a multiplier for multiplying the error value of the first adder by a vector of the first transmit signal; and a coefficient multiplier for multiplying the output of the multiplier by a step constant to calculate a compensation value. In this case, the second adder adds the compensation value to the tap coefficient stored in the tap coefficient memory section to calculate a new tap coefficient.

The pre-equalizer further includes a switch for sending, to the equalizer, either the first transmit signal externally applied or the first transmit signal applied from the first memory. Also, the pre-equalizer further includes a delay section for delaying the first transmit signal and storing it in the first memory.

The pre-equalizer can be used for VSB signal transmission.

In another aspect of the present invention, there is provided a VSB transmission system that includes: (a) a pre-equalizer comprising a first memory for storing a first transmit signal to be transmitted, the first transmit signal being externally applied; a second memory for storing a second transmit signal; and an equalizer for calculating a tap coefficient based on an error value determined as the difference between the first transmit signal stored in the first memory and the second transmit signal stored in the second memory and performing pre-equalization based on the tap coefficient; a transmitter for VSB-modulating the first transmit signal output from the pre-equalizer and sending the modulated transmit signal; and (b) a receiver for VSB-demodulating the signal fed back from the transmitter to generate the second transmit signal, and sending the second transmit signal to the pre-equalizer.

The transmitter includes: a VSB modulator for VSB-modulating the first transmit signal output from the pre-equalizer; a frequency up-converter for up-converting the frequency of the VSB-modulated signal; a channel filter for channel-filtering the up-converted signal; and a switch for feeding back either the signal output from the frequency up-converter and fed into the channel filter or the signal output from the channel filter.

The receiver includes: a frequency down-converter for down-converting the frequency of the signal output from the switch; and a VSB demodulator for VSB-demodulating the down-converted signal and storing the VSB-demodulated signal in the second memory as the second transmit signal.

In the VSB transmission system, the pre-equalizer includes: an N-tap digital filter for equalizing the first transmit signal based on a set tap coefficient; a tap coefficient memory section for storing the tap coefficient of the digital filter; a first adder for calculating an error value as the difference between the first transmit signal stored in the first memory and the second transmit signal stored in the second memory to calculate an error value; and a second adder for calculating a new tap coefficient based on the error value and storing the calculated tap coefficient in the tap coefficient memory section.

In addition, the pre-equalizer includes: a multiplier for multiplying the error value of the first adder by a vector of the first transmit signal; and a coefficient multiplier for multiplying the output of the multiplier by a step constant to calculate a compensation value. The second adder adds the compensation value to the tap coefficient stored in the tap coefficient memory section to calculate a new tap coefficient.

In further another aspect of the present invention, there is provided a VSB transmission method, which is to VSB-transmit a signal to be transmitted, the method including: (a) storing a first transmit signal to be transmitted, the first transmit signal being externally applied, and pre-equalizing it based on a set tap coefficient; (b) modulating the pre-equalized first transmit signal and transmitting the modulated signal; (c) demodulating the transmitted first transmit signal and storing the demodulated signal as a second transmit signal; and (d) calculating a tap coefficient based on an error value determined as the difference between the first transmit signal and the second transmit signal, and updating the set tap coefficient based on the calculated tap coefficient.

The step (d) includes: (d-1) multiplying the error value by a vector of the first transmit signal; (d-2) multiplying the result of the step (d-1) by a step constant to calculate a compensation value; and (d-3) adding the compensation value to the set tap coefficient to calculate a new tap coefficient.

The step (b) includes channel-filtering the modulated first transmit signal, and the step (c) includes demodulating the first transmit signal either before or after the channel-filtering step.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
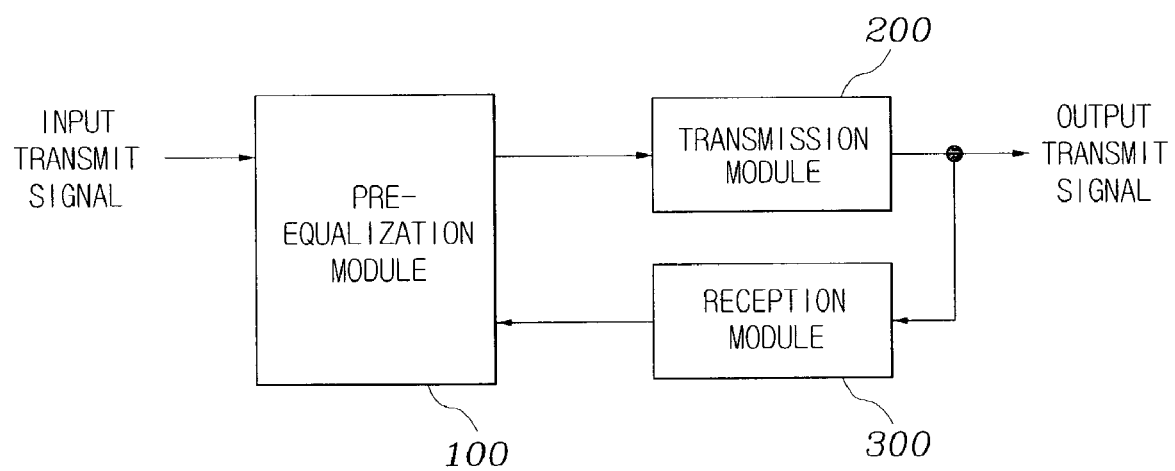
FIG. 1 is an overall block diagram of a VSB transmission system according to an embodiment of the present invention.
Figure 2:
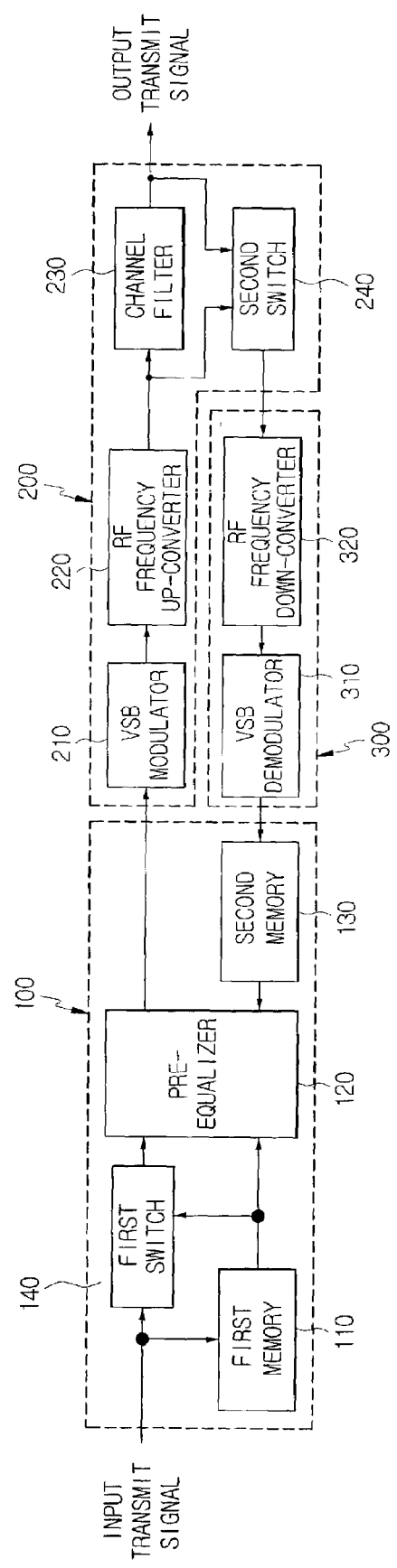
FIG. 2 is a detailed schematic of the VSB transmission system according to the embodiment of the present invention.

FIG. 1 is an overall block diagram of a VSB transmission system according to an embodiment of the present invention, and FIG. 2 is a detailed schematic of the individual modules shown in FIG. 1.

The VSB transmission system according to the embodiment of the present invention largely comprises, as shown in FIG. 1, a pre-equalization module 100 for compensating for the group delay characteristic of an externally applied signal to be transmitted (hereinafter referred to as a "transmit signal"); a transmission module 200 for modulating the output signal of the pre-equalization module 100 to a baseband signal and outputting it as a final transmit signal; and a reception module 300 for demodulating the final transmit signal received from the transmission module 200 and feeding it back to the pre-equalization module 100.

More specifically, the pre-equalization module 100 comprises, as shown in FIG. 2, a first switch 140, a first memory 110, a pre-equalizer 120, and a second memory 13.

The input transmit signal is stored in the first memory 110, or fed into the pre-equalizer 120 via the first switch 140. The first memory 110 stores a reference signal such as an input signal vector $V_{(n)}$, as well as the transmit signal Vk.

The first switch 140 sends the input transmit signal or the output signal of the first memory 110 to the pre-equalizer 120.

The second memory 130 stores a demodulated baseband signal received from the reception module 300, i.e., a demodulated signal Vk' of the transmit signal to be applied to a receiver (not shown).

The pre-equalizer 120 equalizes the signal received from the first switch 140 according to a tap coefficient, and determines an equalizer tap coefficient based on the transmit signal Vk stored in the first memory 110 and the demodulated signal Vk' stored in the second memory 130.

Figure 3:
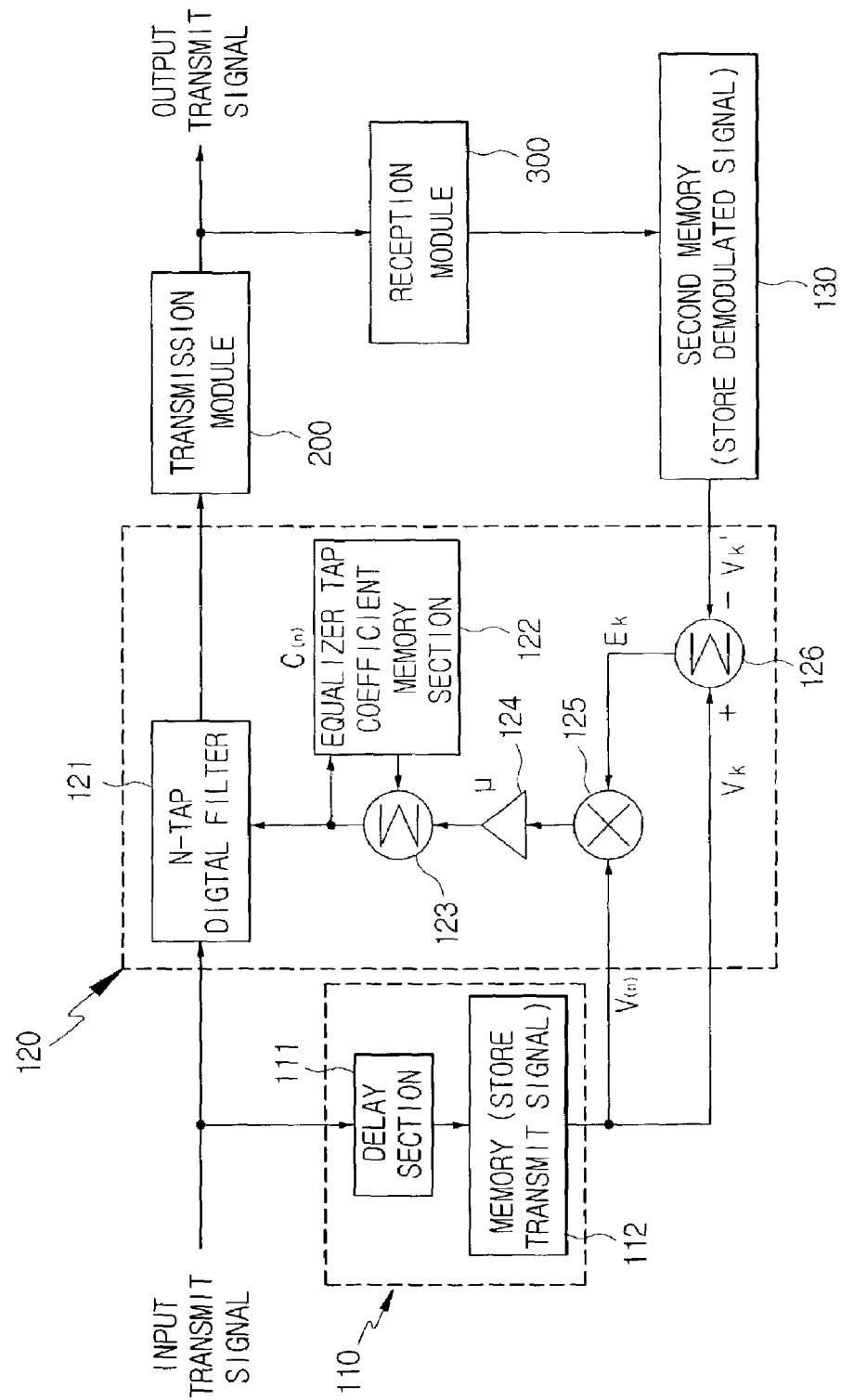
FIG. 3 is a detailed schematic of a pre-equalizer according to the embodiment of the present invention.

FIG. 3 shows a detailed structure of the pre-equalizer.

The pre-equalizer 120 comprises: an N-tap digital filter 121 for delaying an input signal according to a set tap coefficient for filtering; a first adder 126 for calculating an error value Ek as the difference between the transmit signal Vk from the first memory 110 and the demodulated signal Vk' from the second memory 130; a multiplier 125 for multiplying the error value Ek by an input signal reference vector $V_{(n)}$ received from the first memory 110; a coefficient multiplier 124 for multiplying the output signal of the multiplier 125 by a step constant μ to determine a compensation value; and a second adder 123 for adding the compensation value of the coefficient multiplier 124 to a previous tap coefficient $C_{(n)}$ stored in an equalizer tap coefficient memory section 122 to determine a current tap coefficient $C_{(n+1)}$. The tap coefficient determined by the second adder 123 is stored in the equalizer tap coefficient memory section 122 to update the tap coefficient.

Alternatively, the first memory 110 may include, as shown in FIG. 3, a delay section 111 for delaying the transmit signal received from the first memory 110 and storing it. The transmit signal in this case is stored in a memory 112. The delay section 111 may be embodied inside the first memory 110 or separately from the first memory 110.

The transmission module 200 that demodulates the transmit signal from the pre-equalization module 100 as constructed above to output a final transmit signal comprises, as shown in FIG. 2, a VSB modulator 210, an RF frequency up-converter 220, a channel filter 230, and a second switch 240.

The VSB modulator 210 VSB-modulates the equalized transmit signal of the pre-equalization module 100, and the RF frequency up-converter 220 raises the frequency of the VSB-modulated signal. The channel filter 230 removes the RF transmit signal of an unnecessary out-of-band frequency component to output a final transmit signal.

The second switch 240 selects either the input or output signal of the channel filter 230, i.e., the transmit signal, before channel filtering, and the final transmit signal after channel filtering, and sends the selected signal to the reception module 300.

The reception module 300 comprises, as shown in FIG. 2, an RF frequency down-converter 320 for down-converting the frequency of the signal from the second switch 240 to a baseband signal, and a VSB demodulator 310 for VSB-demodulating the baseband signal and sending it to the second memory 130 of the pre-equalization module 100. The demodulated signal Vk' is stored in the second memory 130.

Now, a detailed description will be given to an operation of the above-constructed VSB transmission system according to the embodiment of the present invention.

In order to compensate for the group delay characteristic caused by the channel filter used in the final stage of the VSB transmission system, according to the embodiment of the present invention, the baseband transmit signal Vk is stored and then compared with the demodulated signal Vk', which is formed by demodulating a modulated transmit signal, to calculate an error value between the two signals. The error value is used to determine the tap coefficient of the equalizer.

Figure 4A:
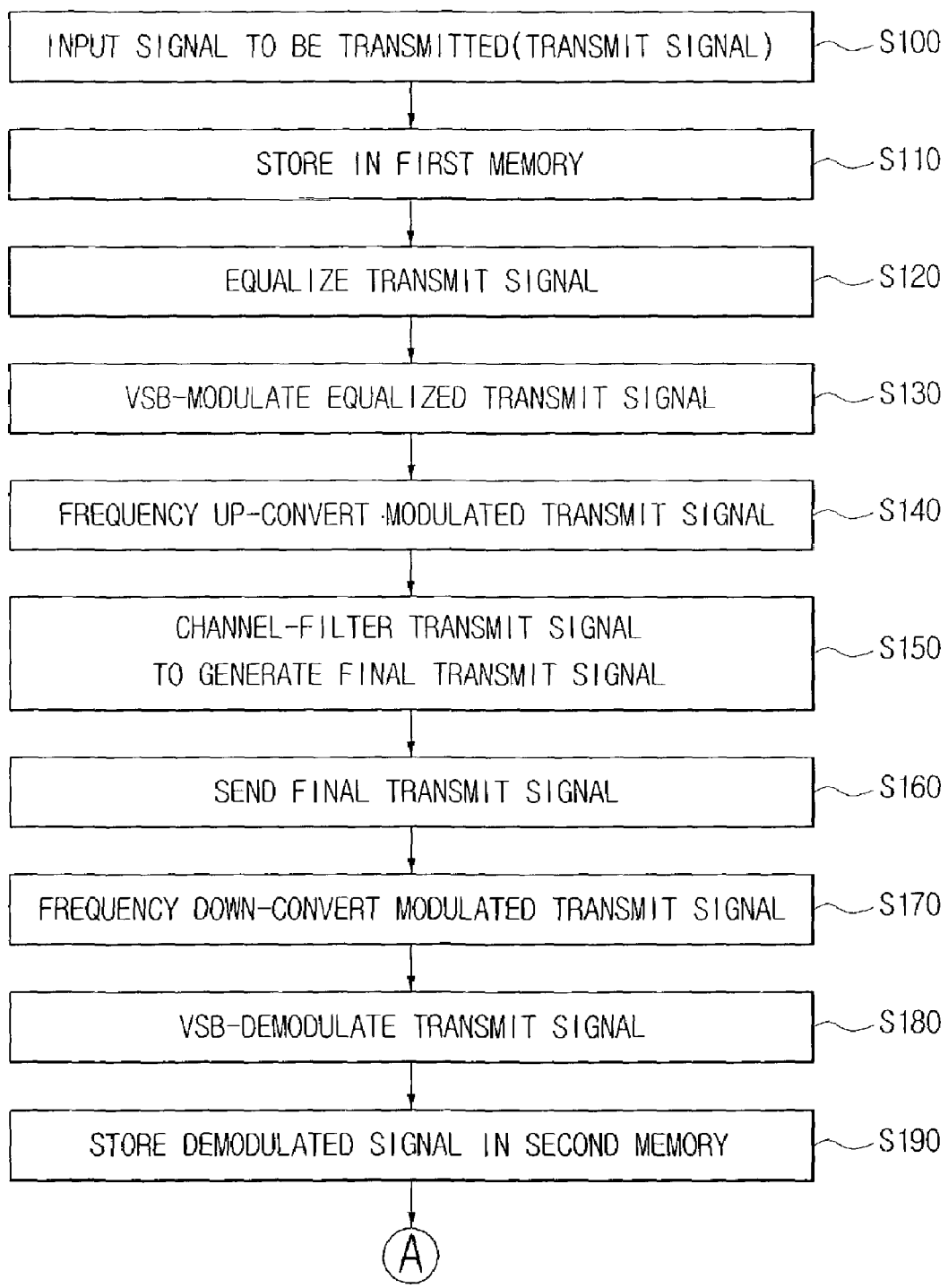
FIGS. 4a and 4b are flow charts illustrating the operation of the VSB transmission system according to the embodiment of the present invention.
Figure 4B:
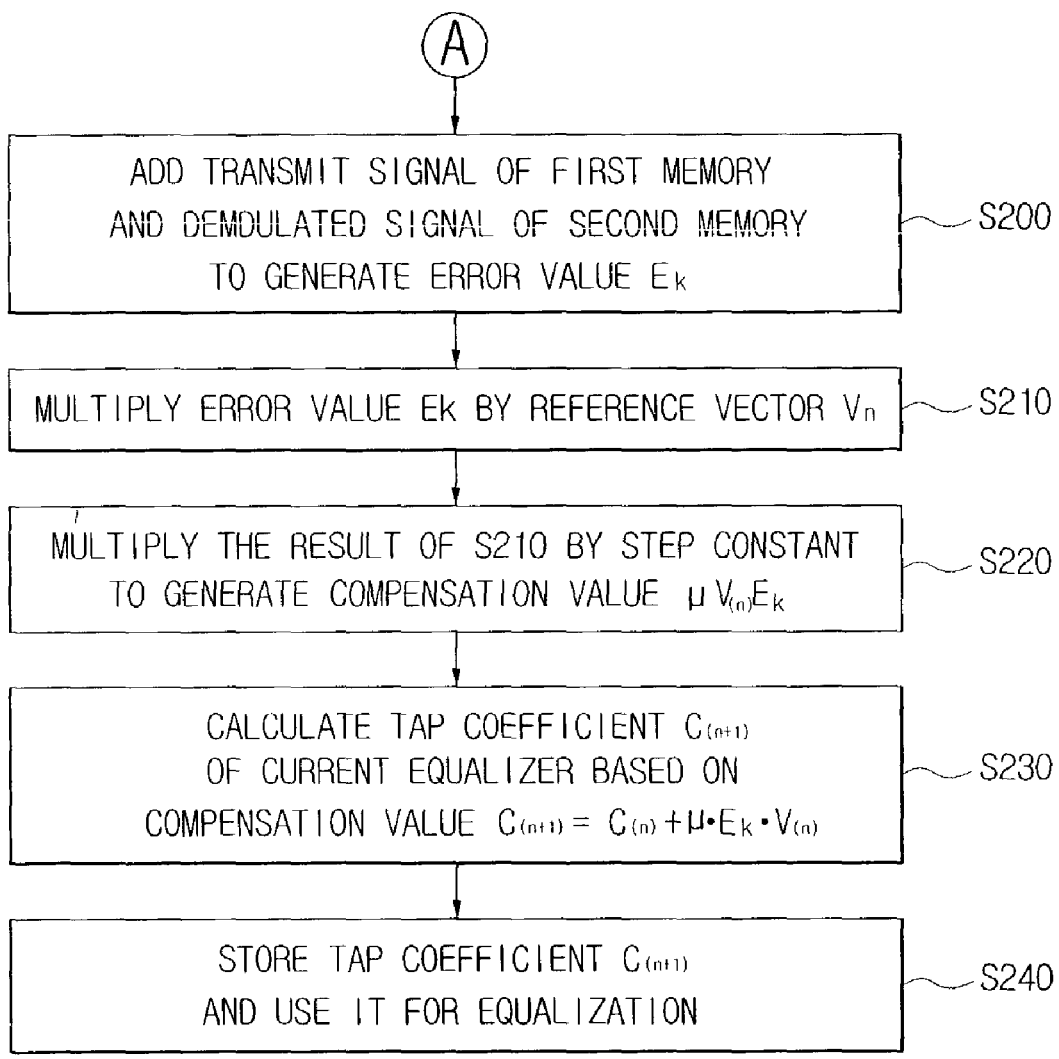

FIGS. 4a and 4b are sequential diagrams illustrating the operation of the VSB transmission system for updating the tap coefficient according to an embodiment of the present invention.

As shown in FIG. 4a, upon receiving an externally applied transmit signal Vk, the pre-equalization module 100 performs equalization to compensate for signal transmission distortion, in step S100.

The transmit signal Vk is fed into the pre-equalizer 120 via the first switch 140 of the pre-equalization module 100 and is also stored in the first memory 110. In this regard, the transmit signal Vk is, as shown in FIG. 3, is stored in the memory 112 via the delay section 111 of the first memory 110. The reason why the transmit signal is delayed at the delay section 111 and then stored in the first memory 110 is to compensate for the time delay introduced by storing the demodulated signal Vk' in the second memory 130 via the VSB modulator 210, the RF frequency up-converter 220, the channel filter 230, the second switch 240, the RF frequency down-converter 320, and the VSB demodulator 310.

As such, the baseband transmit signal before modulation is stored in the first memory 110, in step S110.

On the other hand, the transmit signal Vk fed into the pre-equalizer 120 is equalized by the digital filter 121 having N taps, in step S120. The pre-equalizer 120 performs pre-equalization based on a tap coefficient $C_{(n)}$ at a current time n stored in the equalizer tap coefficient memory section 122. The equalized transmit signal is fed into the transmission module 200.

The VSB modulator 210 of the transmission module 200 VSB-modulates the equalized transmit signal to generate a signal having a desired signal spectrum, and the RF frequency up-converter 220 up-converts the frequency of the modulated signal to a transmittable radio frequency, in steps S130 and S140. The VSB modulation and frequency up-conversion techniques are well known in the field of digital communication and will not be described in detail.

The up-converted transmit signal is fed into the channel filter 230 and filtered. Passing through the channel filter 230, the signal becomes a final transmit signal and is sent to a receiver (not shown) such as a television receiver, in steps S150 and S160.

The transmit signal Vk equalized, modulated, filtered, and transmitted as described above is fed back to the reception module 300.

The second switch 240 of the reception module 300 selects either the fore or back terminal of the channel filter 230, i.e., a signal to be fed into the channel filter 230 or a signal output from the channel filter 230, and sends the selected signal to the RF frequency down-converter 320. Preferably, the second switch 240 selects the input signal of the channel filter 230. More specifically, it is necessary to feed back the RF signal and demodulate it to a baseband signal in order to determine the coefficient of the pre-equalizer. In the embodiment of the present invention, it is possible to use the output signal of the same oscillator, since both the transmission module and the reception module are present in one system. In symbol timing synchronization, however, the signal fed back after passing through the channel filter 230 has a linear distortion due to the group delay characteristic of the channel filter. Thus symbol timing synchronization can be acquired by comparing the signal before it passes through the channel filter 230 with the transmitted signal. For that reason, if not specifically limited thereto, the signal before being fed into the channel filter 230 is selected and fed back to the reception module 300 in the embodiment of the present invention. Alternative, if needed, the output signal of the channel filter 230 is selected and fed back to the reception module 300.

The output signal of the second switch 240 is converted to a signal of a low frequency by the RF frequency down-converter 320, in step S170. The signal is then demodulated via the VSB demodulator 310 and output as the original baseband signal to be transmitted, in step S180. The demodulated baseband signal Vk' is stored in the second memory 130, in step S190.

Subsequently, the pre-equalizer 120 uses the transmit signal Vk and the demodulated signal Vk' stored in the first and second memories 110 and 130 resulting from the above-stated signal transmission and feedback processing, to calculate the equalizer tap coefficient, as follows.

First, as shown in FIG. 4b, the first adder 126 of the pre-equalizer 120 subtracts the demodulated signal Vk' from the transmit signal Vk to calculate an error value Ek, as follows, in step S200.

$$E_k = V_k - V_{k'} \qquad \text{[Equation 1]}$$

Based on the error value Ek, the tap coefficient of the equalizer is updated. Here, the tap coefficient of the equalizer is updated using the LMS algorithm.

More specifically, the multiplier 125 multiplies the input signal vector $V_{(n)}$ received from the first memory 110 by the error value Ek, and the coefficient multiplier 124 multiplies the output value of the multiplier 125 by a step constant μ to calculate a compensation value $\mu E_k V_{(n)}$, in steps S210 and S220.

The second adder 123 updates the tap coefficient using the compensation value as follows, in step S230.

$$C_{n+1}=C_n+\mu E_k V_{(n)} \qquad \text{[Equation 2]}$$

In this equation, $C_{(n)}$ is the tap coefficient of the n-th equalizer; $C_{(n+1)}$ is the tap coefficient of the (n+1)-th equalizer; and $\mu$ is the step constant that determines the convergence characteristic of the equalizer. The step constant is one of the equalizer parameters that determines the convergence rate of the equalizer and the magnitude of the residual error.

$V_{(n)}$ represents input signals corresponding to the number of equalizer taps. Here, $V_{(n)}$ includes the characteristic of the channel filter and implies that the signals (a set of symbols) of as many as there are taps are fed back, demodulated, and stored in the second memory 130. These signals are input signal vectors for determining the equalizer tap coefficient. Until the error value as calculated above becomes sufficiently small, one symbol is newly fed into the input signal vector and the earliest input symbol is removed whenever the equalizer tap coefficient is updated. $V_{(n)}$ is an input signal vector of the same length as $C_{(n)}$ and can be expressed by the following equation.

$$V_{(n)}=\{V_1,V_2,V_3,\Lambda,V_k\} \qquad \text{[Equation 3]}$$

As stated above, the equalizer tap coefficient calculated based on the error value Ek is stored in the coefficient memory section 122, and the N-tap digital filter 121 equalizes the signal received from the first switch 140 based on the updated equalizer tap coefficient $C_{(n+1)}$, in step S240.

According to the embodiment of the present invention, such a simple system configuration makes it easy to compare the input transmit signal with the demodulated signal. As a result, the complexity of the system configuration can be remarkably reduced in realizing the system.

The conventional pre-equalizer, which updates the tap coefficient in real time using the LMS algorithm, has to use all the fed back symbols in receiving the demodulated signal fed back for demodulation in real time and in updating the equalizer tap coefficient. In this case, it is disadvantageously required to acquire symbol timing synchronization in real time based on the signals before and after passing through the channel filter and to use a number of symbols in determining the equalizer tap coefficient. Contrarily, in the embodiment of the present invention, the demodulated signal is stored in the second memory so as to acquire an error signal caused by the channel filter, and the stored signal is repeatedly applied to calculate the tap coefficient. Thus the system configuration can be realized according to the embodiment of the present invention without deterioration of the system performance simply by compensating for the symbol timing of the signals stored only in the second memory.

Figure 5:
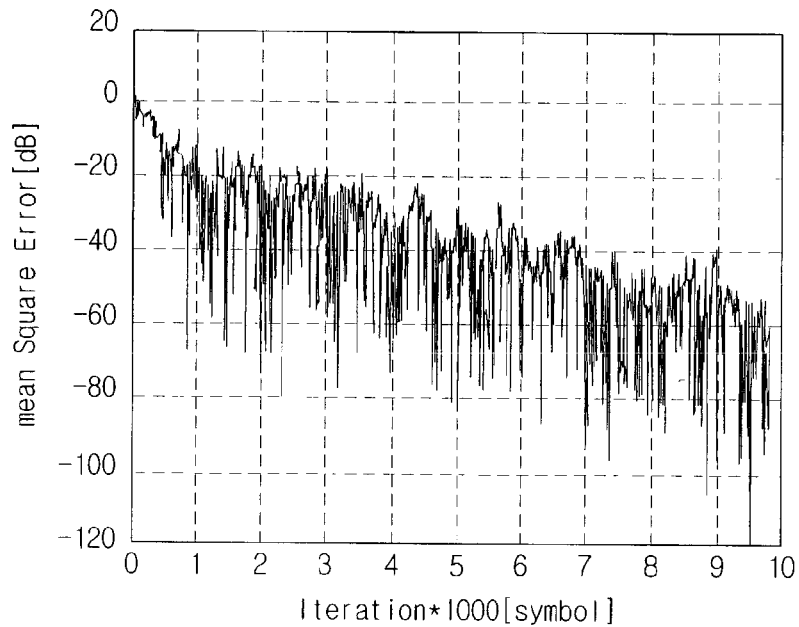
FIG. 5 shows graphs comparing the mean square error of the pre-equalizer according to the embodiment of the present invention with that of the pre-equalizer according to prior art.
Figure 5:
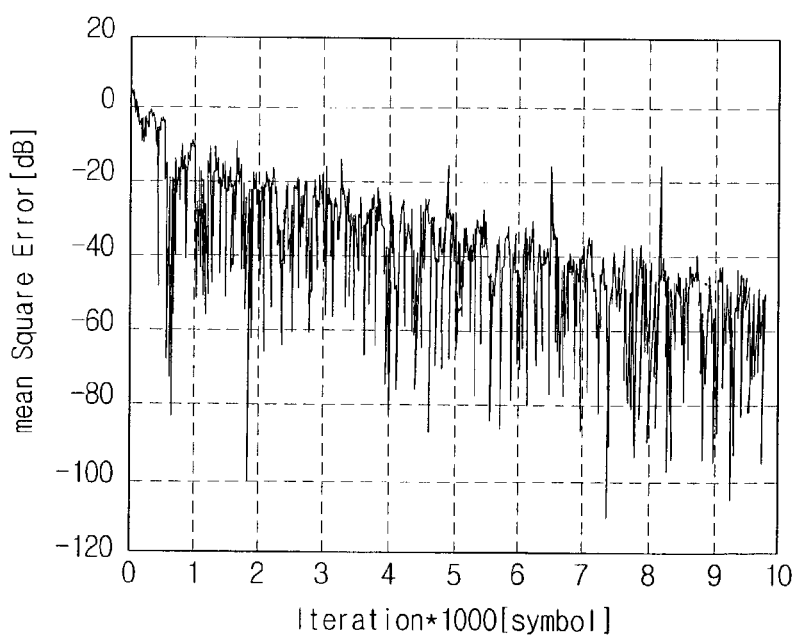

FIG. 5 shows graphs showing the comparison of the pre-equalizer according to the embodiment of the present invention and the conventional pre-equalizer in regard to performance. The comparison is made between the two pre-equalizers in regard to the convergence of the mean square error, and the convergence rate and the magnitude of the residual error value are indexes that represents the performance of the equalizer.

In FIG. 5, (a) is a graph showing the performance of the conventional equalizer and (b) is a graph showing the performance of the equalizer according to the embodiment of the present invention.

Comparing (a) with (b) in FIG. 5, the convergence rate and the magnitude of the residual error value are almost the same. Namely, the embodiment of the present invention simplifies the structure of the equalizer and enables signal equalization without a deterioration of performance, compared with the prior art.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

According to the embodiment of the present invention, the VSB transmission system has a number of memories for separately storing the transmit signal and the demodulated signal. This enables accurate calculation of the tap coefficient for pre-equalization with the system of a simplified structure.

By using data stored in the memories, the tap coefficient for pre-equalization can be accurately calculated off line even in a real-time system, such as a broadcasting system.

Furthermore, the residual error may be calculated using only a small number of transmit signals as in the like manner of using a large number of transmit signals, thereby readily calculating the tap coefficient.

What is claimed is:

1. A pre-equalizer comprising:
a first memory for storing an externally applied first transmit signal to be transmitted;
an equalizer for pre-equalizing the first transmit signal based on a tap coefficient; and
a second memory for storing a second transmit signal, the pre-equalized first transmit signal being modulated, transmitted, fed back, and demodulated into the second transmit signal,
wherein the equalizer updates the tap coefficient based on an error value determined as the difference between the first transmit signal stored in the first memory and the second transmit signal stored in the second memory, and
wherein the equalizer comprises a multiplier for multiplying the error value by a vector of the first transmit signal received from the first memory, and the tap coefficient is further updated based on a value outputted from the multiplier.

2. The pre-equalizer as claimed in claim 1, wherein the equalizer comprises:
an N-tap digital filter for equalizing the input transmit signal based on a set tap coefficient;
a tap coefficient memory section for storing the tap coefficient of the digital filter;
a first adder for calculating an error value as the difference between the first transmit signal stored in the first memory and the second transmit signal stored in the second memory; and
a second adder for calculating a new tap coefficient based on the error value and storing the calculated tap coefficient in the tap coefficient memory section.

3. The pre-equalizer as claimed in claim 2, wherein the equalizer further comprises:
a coefficient multiplier for multiplying the output of the multiplier by a step constant to calculate a compensation value,
wherein the second adder adds the compensation value to the tap coefficient stored in the tap coefficient memory section to calculate a new tap coefficient.

4. The pre-equalizer as claimed in claim 1, further comprising:
a switch for sending to the equalizer, either the first transmit signal externally applied or the first transmit signal stored in the first memory.

5. The pre-equalizer as claimed in claim 1, further comprising:
a delay section for delaying the first transmit signal and storing the delayed signal in the first memory.

6. The pre-equalizer as claimed in claim 1, wherein the pre-equalizer is used for vestigial sideband (VSB) signal transmission.

7. A vestigial sideband (VSB) transmission system comprising:
a pre-equalizer for pre-equalizing an externally applied first transmit signal based on a tap coefficient, wherein the pre-equalizer comprises;
a transmitter for VSB-modulating the pre-equalized first transmit signal output from the pre-equalizer and sending the modulated transmit signal; and
a receiver for receiving the signal fed back from the transmitter, VSB-demodulating the received signal to generate the second transmit signal, and sending the second transmit signal to the pre-equalizer,
wherein the pre-equalizer comprises a first memory for storing the first transmit signal, a second memory for storing the second transmit signal sent from the receiver, and an equalizer for pre-equalizing the first transmit signal based on the tap coefficient and outputting the pre-equalized first transmit signal, wherein the equalizer comprises a multiplier for multiplying an error value, determined as the difference between the first transmit signal stored in the first memory and the second transmit signal stored in the second memory, by a vector of the first transmit signal received for the first memory, and
wherein the tap coefficient is updated based on the error value and a value outputted from the multiplier.

8. The VSB transmission system as claimed in claim 7, wherein the transmitter comprises:
a VSB modulator for VSB-modulating the first transmit signal output from the pre-equalizer;
a frequency up-converter for up-converting the frequency of the VSB-modulated signal;
a channel filter for channel-filtering the up-converted signal; and
a switch for feeding back either the signal output from the frequency up-converter and fed into the channel filter or the signal output from the channel filter.

9. The VSB transmission system as claimed in claim 8, wherein the receiver comprises:
a frequency down-converter for down-converting the frequency of the signal output from the switch; and
a VSB demodulator for VSB-demodulating the down-converted signal and storing the VSB-demodulated signal in the second memory as the second transmit signal.

10. The VSB transmission system as claimed in claim 7, wherein the equalizer of the pre-equalizer comprises:
an N-tap digital filter for equalizing the first transmit signal based on a set tap coefficient;
a tap coefficient memory section for storing the tap coefficient of the digital filter;
a first adder for adding the first transmit signal stored in the first memory and the second transmit signal stored in the second memory to calculate an error value; and
a second adder for calculating a new tap coefficient based on the error value and storing the calculated tap coefficient in the tap coefficient memory section.

11. The VSB transmission system as claimed in claim 10, wherein the equalizer further comprises:
a coefficient multiplier for multiplying the output of the multiplier by a step constant to calculate a compensation value,
wherein the second adder adds the compensation value to the tap coefficient stored in the tap coefficient memory section to calculate a new tap coefficient.

12. A vestigial sideband (VSB) transmission method, which is to VSB-pre-equalize a signal to be transmitted, the method comprising:
(a) storing a first transmit signal to be transmitted, the first transmit signal being externally applied, and pre-equalizing it based on a set tap coefficient;
(b) modulating the pre-equalized first transmit signal and transmitting the modulated signal;
(c) demodulating the transmitted first transmit signal and storing the demodulated signal as a second transmit signal; and
(d) updating the set tap coefficient based on an error value determined as the difference between the first transmit signal and the second transmit signal,
wherein the tap coefficient is updated based on a value to be acquired by multiplying the error value by a vector of the first transmit signal received from the first memory.

13. The VSB transmission method as claimed in claim 12, wherein the step (d) comprises:
(d-1) calculating an error value as the difference between the stored first transmit signal and the second transmit signal;
(d-2) multiplying the error value by a vector of the first transmit signal;
(d-3) multiplying the result of the step (d-2) by a step constant to calculate a compensation value; and
(d-4) adding the compensation value to the set tap coefficient to calculate a new tap coefficient.

14. The VSB transmission method as claimed in claim 12, wherein the step (b) comprises channel-filtering the modulated signal, and the step (c) comprises demodulating the transmitted signal either before or after the channel-filtering step.

* * * * *